US010951963B2

(12) United States Patent
Sareen et al.

(10) Patent No.: US 10,951,963 B2
(45) Date of Patent: Mar. 16, 2021

(54) FAST MESH RESTORATION SYSTEMS AND METHOD WITH REAL TIME DETECTION OF FAULT LOCATION

(71) Applicants: Jatin Sareen, New Delhi (IN); Waseem Reyaz Khan, Gurgaon (IN); Kapil Juneja, Gurgaon (IN); Rajagopalan Kannan, Gurgaon (IN)

(72) Inventors: Jatin Sareen, New Delhi (IN); Waseem Reyaz Khan, Gurgaon (IN); Kapil Juneja, Gurgaon (IN); Rajagopalan Kannan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 809 days.

(21) Appl. No.: 14/489,838

(22) Filed: Sep. 18, 2014

(65) Prior Publication Data
US 2016/0043797 A1 Feb. 11, 2016

(30) Foreign Application Priority Data
Aug. 7, 2014 (IN) .......................... 2237/DEL/2014

(51) Int. Cl.
*H04Q 11/00* (2006.01)
*H04J 3/14* (2006.01)

(52) U.S. Cl.
CPC ............ *H04Q 11/0005* (2013.01); *H04J 3/14* (2013.01); *H04J 2203/006* (2013.01)

(58) Field of Classification Search
CPC ............ H04B 10/038; H04Q 11/0005; H04Q 2011/006
See application file for complete search history.

(56) References Cited

U.S. PATENT DOCUMENTS

| 7,333,438 B1 * | 2/2008 | Rabie ................. H04L 41/0654 370/216 |
| 7,391,720 B1 | 6/2008 | Kuditipudi et al. |
| 7,590,051 B1 * | 9/2009 | Skalecki ............ H04L 41/0668 370/218 |
| 8,259,733 B2 | 9/2012 | Conklin et al. |
| 8,417,111 B2 | 4/2013 | Moynihan et al. |
| 8,457,001 B2 | 6/2013 | Madrahalli et al. |
| 8,494,363 B2 | 7/2013 | Calderon et al. |
| 8,509,055 B2 | 8/2013 | Khan et al. |

(Continued)

FOREIGN PATENT DOCUMENTS

CN 102904634 A 1/2013

OTHER PUBLICATIONS

"Interfaces for the optical transport network," International Telecommunication Union, Feb. 2012, pp. 1-238.

(Continued)

*Primary Examiner* — Mina M Shalaby
(74) *Attorney, Agent, or Firm* — Clements Bernard Walker; Lawrence A. Baratta, Jr.; Christopher L. Bernard

(57) ABSTRACT

Systems and methods for fast restoration in a network using a control plane include detecting a failure on a link associated with the node; and providing failure information through in-band data path overhead of an affected connection, wherein the in-band data path overhead is sent over a fast path, wherein the failure information is received at an originating node of the affected connection via the fast path, prior to the originating node receiving control plane signaling via a slow path relative to the fast path.

19 Claims, 7 Drawing Sheets

(56) References Cited

U.S. PATENT DOCUMENTS

| | | | |
|---|---|---|---|
| 8,559,812 | B2 | 10/2013 | Oltman et al. |
| 8,619,553 | B2 | 12/2013 | Madrahalli et al. |
| 8,638,683 | B2 | 1/2014 | Honma et al. |
| 8,682,160 | B2 | 3/2014 | Prakash et al. |
| 8,699,873 | B2 | 4/2014 | Lyon et al. |
| 2008/0212497 | A1 | 9/2008 | Getachew et al. |
| 2011/0274427 | A1 | 11/2011 | Madrahalli et al. |
| 2012/0230674 | A1 | 9/2012 | Yuan et al. |
| 2012/0287778 | A1* | 11/2012 | Saitoh ................ H04L 41/0663 370/228 |
| 2013/0007553 | A1 | 1/2013 | Nishida et al. |
| 2013/0039644 | A1 | 2/2013 | Taniguchi et al. |
| 2014/0093235 | A1 | 4/2014 | Gareau et al. |
| 2014/0126899 | A1 | 5/2014 | Prakash et al. |
| 2014/0199072 | A1* | 7/2014 | Nuijts ................ H04J 3/0682 398/75 |
| 2015/0334004 | A1* | 11/2015 | Hussain ................ H04L 45/22 398/5 |

OTHER PUBLICATIONS

"Architecture for the automatically switched optical network," International Telecommunication Union, Feb. 2012, pp. 1-124.

\* cited by examiner

FAST MESH RESTORATION SYSTEMS AND METHOD WITH REAL TIME DETECTION OF FAULT LOCATION

CROSS-REFERENCE TO RELATED APPLICATION(S)

The present patent application/patent claims the benefit of priority of Indian Patent Application No. 2237/DEL/2014, filed on 7 Aug. 2014, and entitled "FAST MESH RESTORATION SYSTEMS AND METHODS WITH REAL TIME DETECTION OF FAULT LOCATION," the contents of which are incorporated in full by reference herein.

FIELD OF THE DISCLOSURE

The present disclosure relates generally to optical networking systems and methods. More particularly, the present disclosure relates to fast mesh restoration systems and methods that use real time detection of fault location at a source/originating node.

BACKGROUND OF THE DISCLOSURE

Optical (i.e., transport) networks and the like (e.g., DWDM, Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP and Label Switched Paths (LSPs) in GMPLS and MPLS. Control planes use the available paths to route the SNCs/LSPs and program the underlying hardware accordingly.

One aspect of control planes is to provide mesh restoration of the signaled connections in response to failures. For example, in case of a fiber/bundle cut, a control plane node at a point of the failure initiates mesh restoration by sending control plane RELEASE messages corresponding to each connection. The RELEASE messages are sent towards the source/originating node of the corresponding connection. The RELEASE messages are processed sequentially by each node in a path to the source/originating node. Specifically, each node receives RELEASE messages on an egress link, initiates the release of local resources (bandwidth/optical cross connect), and forwards RELEASE messages to ingress links. Once the RELEASE messages reach corresponding originating nodes, mesh restoration on alternate paths is triggered by the originating nodes, i.e., in source-routed control plane networks. Disadvantageously, the RELEASE message processing in conventional control plane networks is a sequential process and the amount of time RELEASE messages take to reach originating nodes adds to mesh restoration time and traffic outage time. Additionally, the RELEASE message is forwarded by software tasks/modules which check ingress objects corresponding to egress objects; thus delays are directly proportional to a number of nodes involved and a number of connections impacted. Disadvantageously, mesh restoration is slow and dependent on a RELEASE message being processed on each hop in a call path.

BRIEF SUMMARY OF THE DISCLOSURE

In an exemplary embodiment, a method, by a node in a network using a control plane, for fast restoration in the network includes detecting a failure on a link associated with the node; and providing failure information through in-band data path overhead of an affected connection, wherein the in-band data path overhead is sent over a fast path, wherein the failure information is received at an originating node of the affected connection via the fast path, prior to the originating node receiving control plane signaling via a slow path relative to the fast path. The method can further include generating and forwarding the control plane signaling based on the failure, wherein the control plane signaling is sent over the slow path. A restoration procedure can be initiated, at the originating node, in the control plane responsive to the receipt of the failure information from the fast path, prior to the originating node receiving the control plane signaling via the slow path. The restoration procedure can exclude a node and a link associated with the failure information, and wherein the node and the link are excluded since routing updates in the slow path are not available at the originating node, upon receiving the failure information in the fast path.

One or more intermediate nodes of the affected connection can be configured to receive the failure information via the fast path, to parse and pass the failure information to the control plane operating at each of the one or more intermediate nodes, and to perform a first action based on the received failure information. The first action can be releasing local resources associated with the affected connection, and forwarding routing updates related to the released local resources via the slow path. The first action can be releasing local resources associated with the affected connection at an expiration of a hold-off period prior to receiving information from the originating node, or performing a second action based on the information from the originating node, responsive to receiving the information from the originating node within the hold-off period. One or more intermediate nodes can be configured to generate and forward the control plane signaling via the slow path, upon receiving the failure information, to adjacent nodes that do not support the fast path. The originating node can be configured to squelch the failure information in the overhead.

The fast path can operate in real-time via injection of the failure information in the data path overhead upon detection of the failure and is negligibly impacted in its time delay by a number of intermediate nodes between the node and the originating node, and the slow path can operate in software based on processing and forwarding the control plane signaling sequentially through the intermediate nodes to the originating node and is delayed based on the number of the intermediate nodes. The affected connection can utilize Optical Transport Network (OTN). The affected connection can utilize Optical Transport Network (OTN) and the failure information is inserted in Fault Type and Fault Location (FTFL) reporting communication channel bytes of the overhead. The failure information can be inserted in either forward or backward operator-specific fields in the FTFL reporting communication channel bytes of the overhead, based on a direction of the failure.

In yet another exemplary embodiment, a node, in a network using a control plane, configured for providing fast restoration in the network includes one or more line modules configured to inject information in overhead on connections; and a controller communicatively coupled to the one or more line modules, wherein the controller is configured to operate a distributed control plane through a communications channel in the overhead; wherein, responsive to a failure on a link, the one or more line modules are configured to inject information identifying the failure in the overhead of each one of affected connections, over a fast path, and wherein, responsive to the failure on the link, the controller is also configured to generate and forward control plane signaling towards originating nodes of the affected connections over a slow path relative to the fast path. A restoration procedure can be initiated in the control plane, responsive to the fast path prior to the originating node receiving the control plane signaling via the slow path.

The restoration procedure can exclude a node associated with the node identifier and a link associated with the link identifier, wherein the node and the link can be excluded since routing updates in the slow path are not available at the originating node upon receiving the information in the fast path. The affected connection can utilize Optical Transport Network (OTN). The affected connection can utilize Optical Transport Network (OTN) and the information based on the failure is inserted in Fault Type and Fault Location (FTFL) reporting communication channel bytes of the overhead.

In yet another exemplary embodiment, a network includes a plurality of nodes interconnected by a plurality of links; and a control plane operating between the plurality of nodes; wherein, responsive to detecting a failure on one link of the plurality of links, nodes associated with the link are configured to generate and forward control plane signaling based on the failure over a slow path and inject information based on the failure in overhead of affected connections over a fast path relative to the slow path, and wherein an originating node of the affected connection is configured to receive the information based on the failure via the fast path prior to receiving the information via the slow path. The affected connection can utilize Optical Transport Network (OTN) and the information based on the failure is inserted in Fault Type and Fault Location (FTFL) reporting communication channel bytes of the overhead.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, fast mesh restoration systems and methods using real time detection of fault location are described. Variously, the fast mesh restoration systems and methods contemplate operation in a control-plane based network and propose a substantially instantaneous distribution of fault locations to speed up mesh restoration. The fast mesh restoration systems and methods optimize the time taken by the RELEASE message to reach the originating node, by using unused bytes from path overhead bytes, which do not get impacted due to a path fault. For example, for Layer 1 OTN control plane networks, fault type and fault location (FTFL) reporting, communication channel bytes can be used for carrying release specific message data (for example, control plane Connection Incarnation number, control plane Link ID and control plane Node ID of Point of failure). On any failure (e.g., Loss of Signal (LOS), Backward Defect Indication (BDI), etc.) that occurs in a mesh of a signaled connection (e.g., SNC, LSP), a line module/tributary would inject failure information (which contains control plane Connection Incarnation number, and failed node and link identifiers) in FTFL bytes for all the paths configured over a failed line. With this information propagated in real-time, each receiving node along the path parses these bytes and passes the information from the line module/tributary to the control plane for action based thereon. The control plane, at intermediate nodes, could perform actions immediately (e.g., release of local resources) or after a configured hold-off time period to wait for messaging from the originating node.

The control plane at the originating node also gets this information in real-time from the line module/tributary and can start the restoration process immediately (as opposed until waiting for the RELEASE message to propagate via software). Advantageously, since receiving the information in the frame data is much faster compared to RELEASE messages (which are software controlled), there is a huge savings in time. Of note, the originating node uses the received control plane Node ID, Link ID, and information identifying failed connections for excluding a failed link from the mesh restoration path of the failed connections, since routing updates would not have yet come through slow path. Advantageously, failure information reaches the originating node faster, resulting in mesh restoration completion being faster, hence improving traffic hit times on a line failure in the path. Also, the time taken for failure information to propagate to the originating node is negligibly impacted by a number of nodes in the path.

Figure 1:
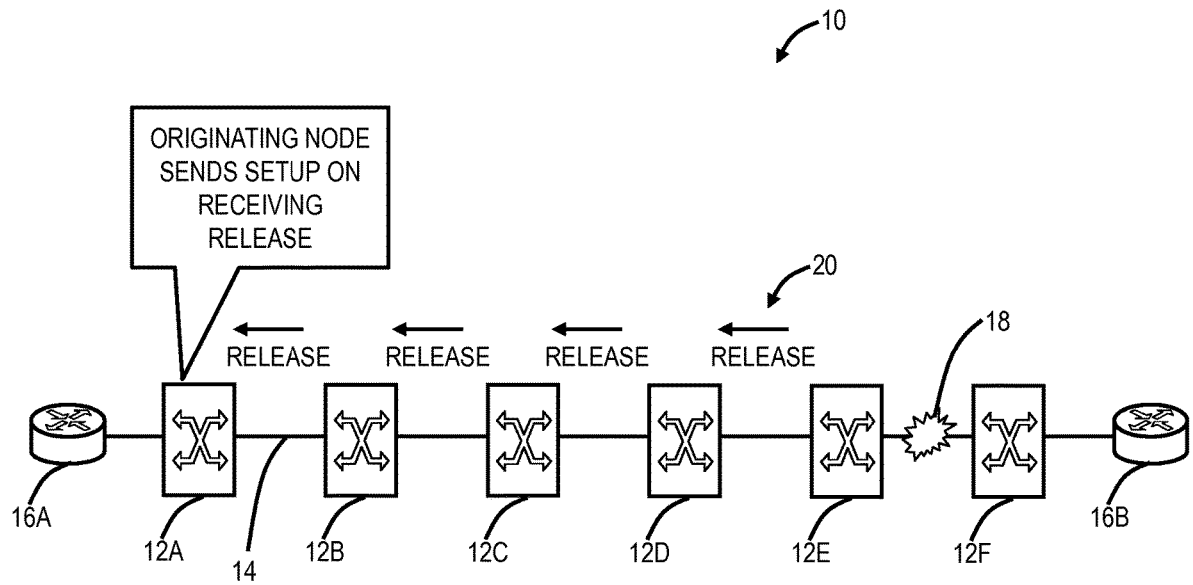
FIG. 1 is a network diagram of a network with various interconnected nodes operating a control plane illustrating a conventional RELEASE subsequent to a failure.
Figure 9:
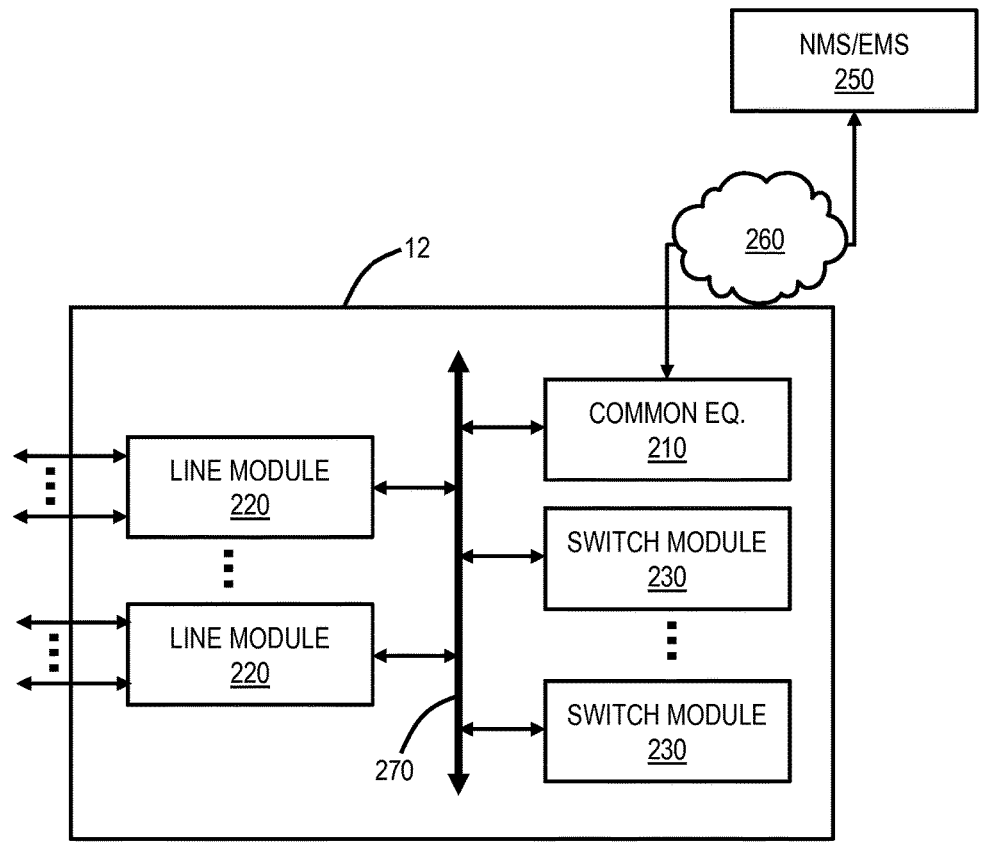
FIG. 9 is a block diagram of an exemplary node for use with the systems and methods described herein.

Referring to FIG. 1, in a conventional embodiment, a network diagram illustrates a network 10 with various interconnected nodes 12A-12F operating a control plane. Each of the nodes 12A-12F are interconnected by one or more links 14, and customer premises equipment (CPE) 16A, 16B is interconnected through the nodes 12A-12F. For illustration purposes, the network 10 is illustrated with the nodes 12A-12F in a linear configuration. Of course, the various systems and methods described herein contemplate any type of network configuration—linear, rings, mesh, etc. The nodes 12A-12F can be network elements such as optical switches, add/drop multiplexers, cross-connects, etc. that operate the control plane (e.g., ASON, GMPLS, OSRP, etc.) and provide signaled connections there between (e.g., SNCs, LSPs, etc.). An exemplary implementation of a node 12 is illustrated in FIG. 9. The links 14 include a Layer 0, Layer 1, Layer 2, and/or a Layer 3 component. For example, as described herein, Layer 0 is DWDM—i.e., wavelengths physically forming the links 14. The Layer 1 component may include OTN, SONET, SDH, etc., the Layer 2 component may include Ethernet, MPLS, etc., and the Layer 3 component may include IP, etc. For purposes of the systems and methods described herein, the control plane operates at least at Layer 1.

In a conventional embodiment example of FIG. 1, there is signaled connection between the CPEs 16A, 16B through the nodes 12A-12F, and there is a failure 18 on the link 14 between the nodes 12E, 12F. The signaled connection has the node 12A as the originating node. Based on the failure 18, the node 12E generates a RELEASE message 20, the node 12E releases local resources associated with the signaled connection, and the node 12E forwards the RELEASE message 20 towards the originating node 12A. While propagating to the originating node 12A, the RELEASE message 20 is received at each of the nodes 12D, 12C, 12B sequentially where it is processed, associated local resources are released, and the RELEASE message 20 is forwarded. When the originating node 12A receives the RELEASE message 20, it performs restoration of the signaled connection and sends a new SETUP message based thereon. The propagation of the RELEASE message 20 is sequential and delayed at each of the nodes 12D, 12C, 12B based on the associated software processing.

Figure 2:
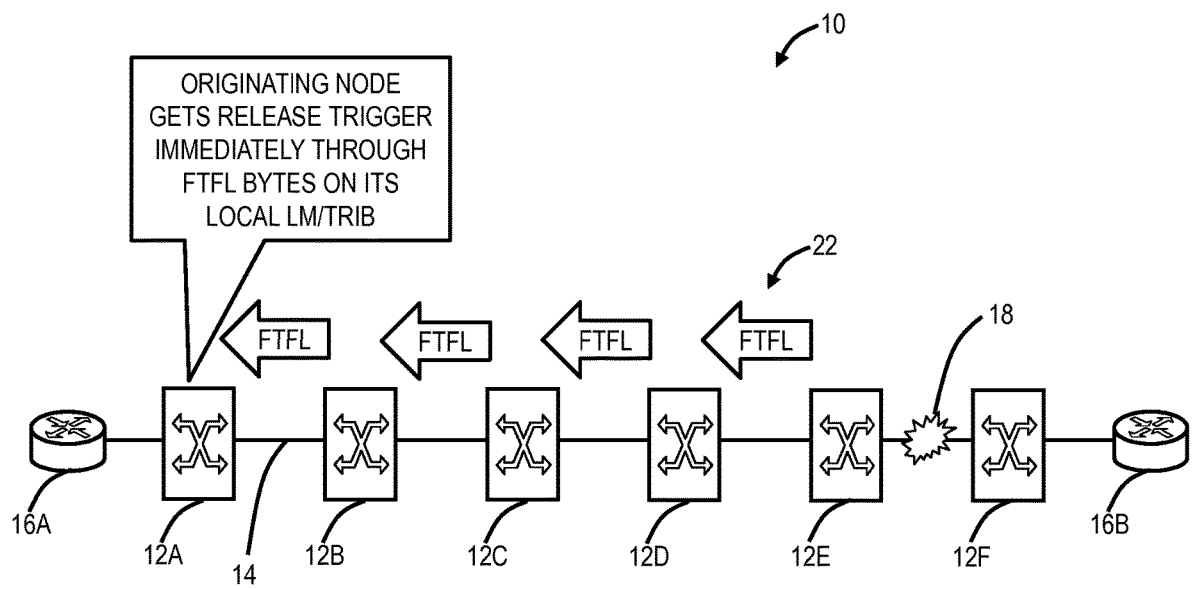
FIG. 2 is a network diagram of the network of FIG. 1 with various interconnected nodes operating a control plane and utilizing the fast mesh restoration systems and methods.

Referring to FIG. 2, in an exemplary embodiment, a network diagram illustrates the network 10 with various interconnected nodes 12A-12F operating a control plane and utilizing the fast mesh restoration systems and methods. The fast mesh restoration systems and methods speed up distribution of the information in the RELEASE message 20 by incorporating the information in overhead of the signaled connection. The RELEASE message 20 is optionally propagated on a control plane channel, whereas the fast mesh restoration systems and methods include the information in the overhead, which is propagated in real-time to all of the nodes 12D, 12C, 12B, 12A (at once, not sequentially). The RELEASE message 20 can be Overhead information propagates instantly from the node 12E. The signaled connection can be OTN, SONET, SDH, etc. and the information can be propagated in the associated OTN, SONET, or SDH overhead. For illustration purposes, the following description references OTN overhead for propagating the information, but those of ordinary skill in the art will recognize that these systems and methods apply equally to SONET, SDH, etc.

Figure 3:
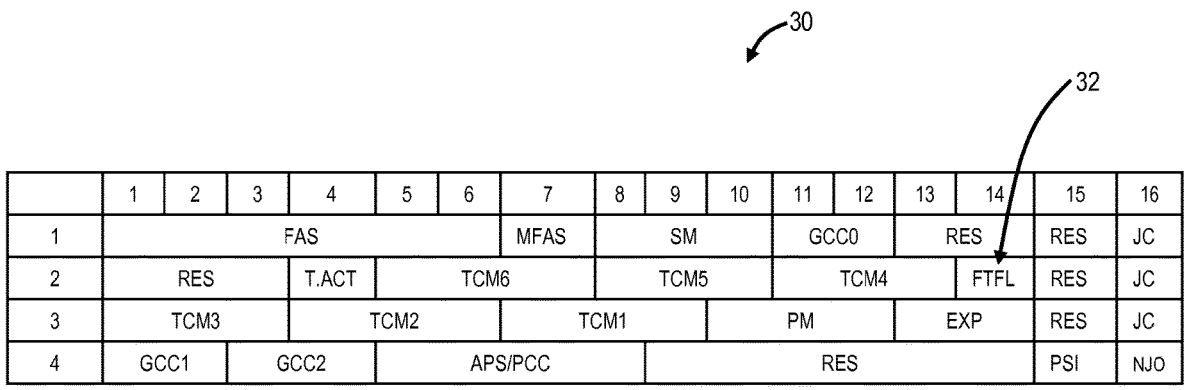
FIG. 3 is a block diagram of G.709 OTN overhead.

Referring to FIG. 3, in an exemplary embodiment, a block diagram illustrates G.709 OTN overhead 30 which is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the OTN overhead 30 includes Forward Error Correction (FEC) data (not shown) in the frame. The OTU frame alignment bytes include a frame alignment signal (FAS) bytes and a multi-frame alignment signal (MFAS). Also, the OTN overhead 30 includes section monitoring (SM) bytes and path monitoring (PM) bytes to provide optical layer error management between optical section and path in G.709. The SM bytes include dedicated bit-interleaved parity 8 (BIP-8) monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI, which is similar to path trace in SONET. General communication channels 0, 1, 2 (GCC0, GCC1, GCC2) bytes provide a communications channel between adjacent OTN nodes, and this communications channel can be used for control plane signaling.

The OTN overhead 30 further includes a payload signal identifier (PSI), justification control (JC), and negative justification opportunity (NJO). For asynchronous clients such as 10GbE and 10G FC, NJO and PJO are used as stuff bytes similar to PDH. If the client rate is lower than an OPU rate, then extra stuffing bytes may be inserted to fill out the OPU. Similarly, if the incoming signal is slightly higher than the OPU rate, NJO and PJO bytes may be replaced with signal information, and the JC bytes reflect whether NJO and PJO are data or stuff bytes the JC bytes are used at the off-ramp to correctly de-map the signal. The PSI provides an identification of the payload signal. Further, the OTN overhead 30 also includes six levels of Tandem Connection Monitoring (TCMn).

Figure 4:
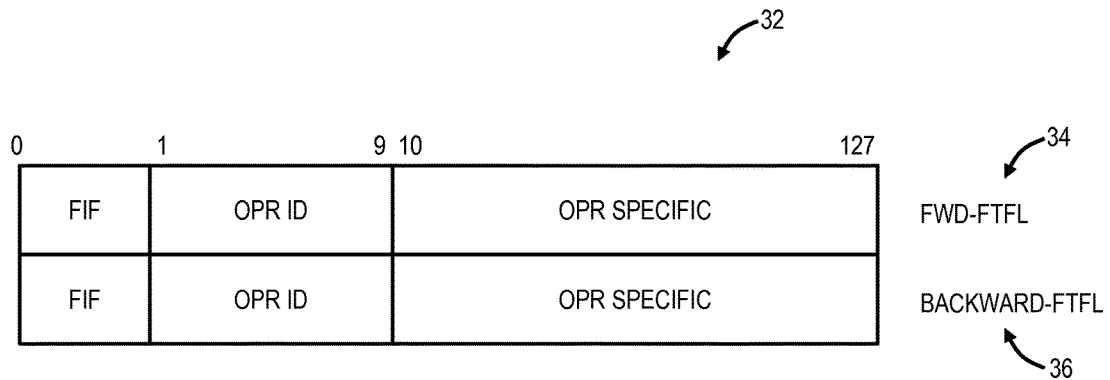
FIG. 4 is a block diagram of a FTFL message in the G.709 OTN overhead of FIG. 3.
Figure 7:
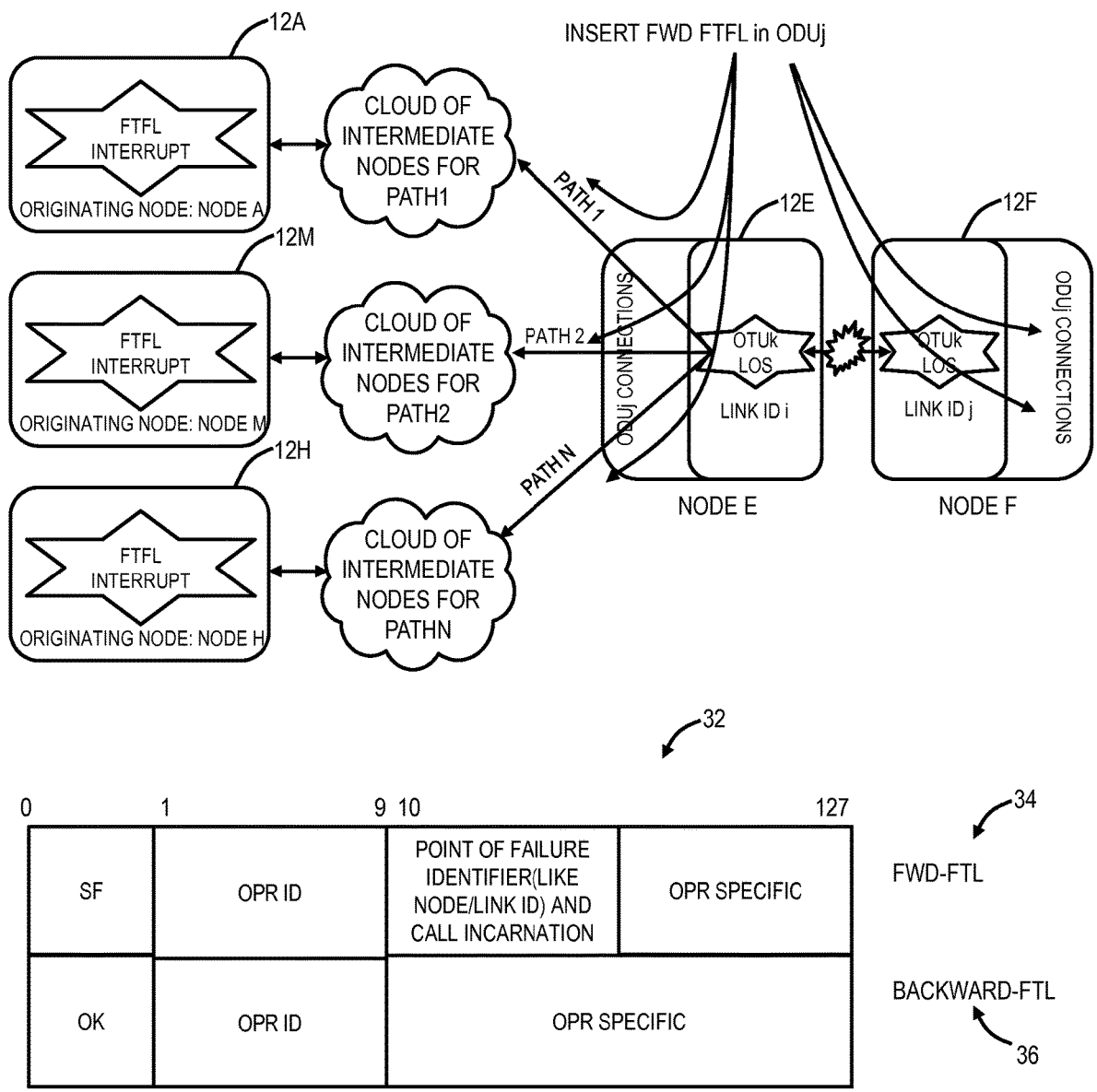
FIG. 7 is a logical diagram of a bidirectional fiber cut case for the failure 18 in the network of FIG. 6.
Figure 8:
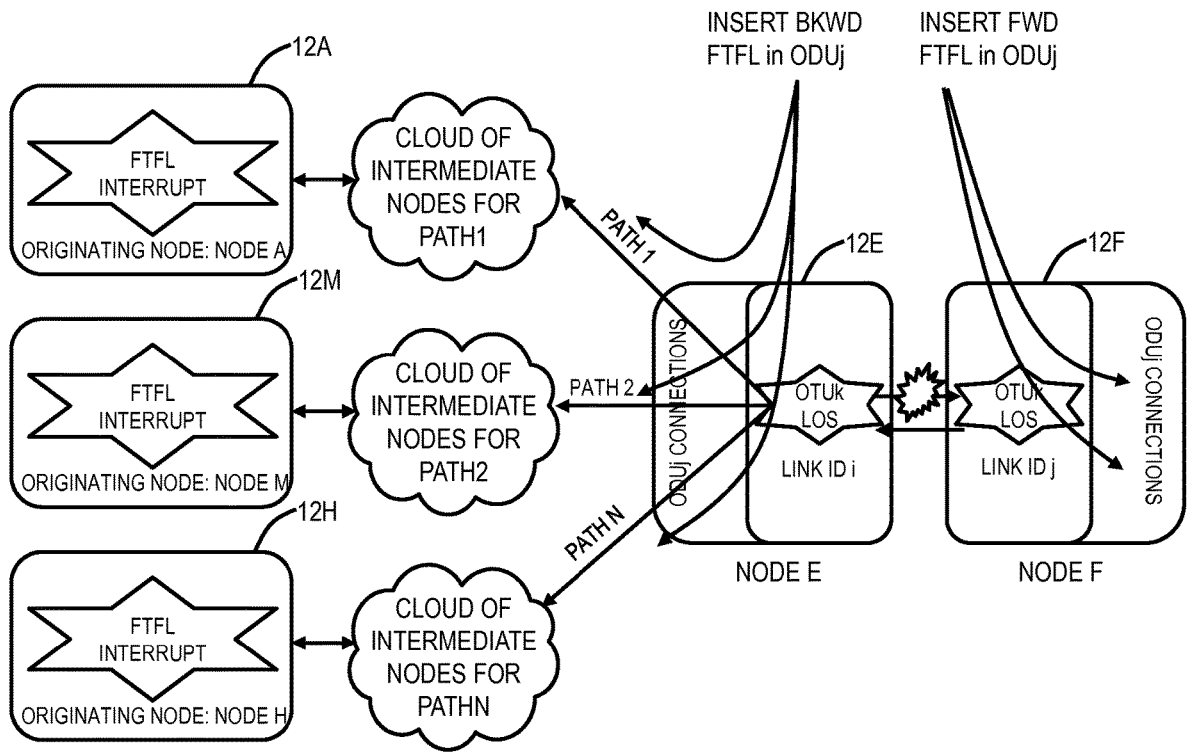
FIG. 8 is a logical diagram of a unidirectional fiber cut case for the failure 18 in the network of FIG. 6.
Figure 8:
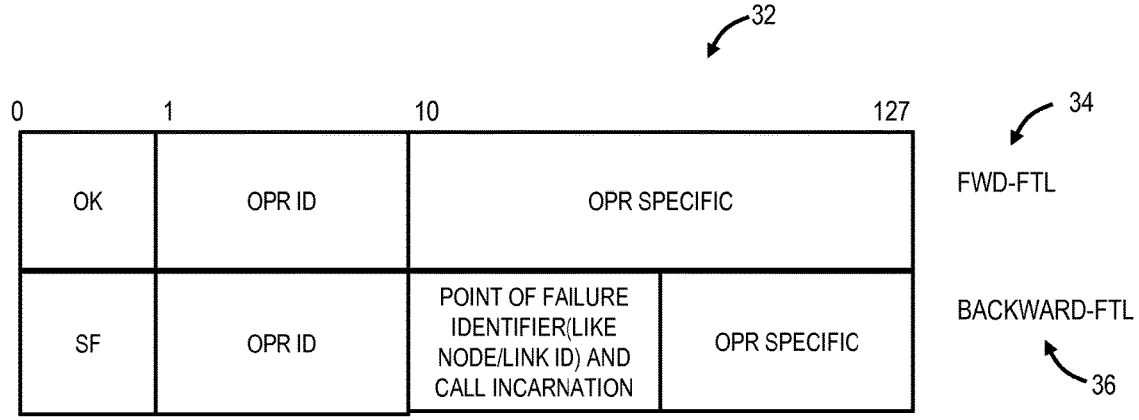

In an exemplary embodiment, the fast mesh restoration systems and methods can utilize Fault Type and Fault Location (FTFL) reporting communication channel bytes (FTFL message 32) for carrying release specific message data (e.g., control plane Connection Incarnation number, control plane Link ID and control plane Node ID of point of failure). The FTFL message 32 is allocated in the ODUk overhead to transport a 256-byte Fault Type and Fault Location (FTFL) message. The FTFL message 32 is located in row 2, column 14 of the ODUk overhead. The FTFL message 32 includes two 128-byte fields as shown in FIG. 4, a forward FTFL 34 and a backward FTFL 36. The forward FTFL 34 is allocated in bytes 0 to 127 of the FTFL message 32. The backward FTFL 36 is allocated in bytes 128 to 255 of the FTFL message 32. The forward FTFL 34 and the backward FTFL 36 are further divided into three subfields as shown in FIG. 4, a forward/backward fault type indication field (FIF), a forward/backward operator identifier field (OPR ID), and a forward/backward operator-specific field (OPR SPECIFIC). Note, the forward FTFL 34 and the backward FTFL 36 are also shown in FIGS. 7 and 8 with the operator-specific fields utilized to carry information related to failures, e.g. Node ID, Link ID, and information identifying failed connections.

The FTFL message 32 can be used to instantly propagate the same information in the RELEASE message 20 regarding the failure 18. At the failure 18, a line module, on detecting any failure that results in a mesh restoration, injects failure information in FTFL message 32 for all the paths configured over the failed link. For example, on seeing a failure at OTU or at a line TCM, the associated line module fills the FTFL message 32 with information corresponding to individual ODUk/ODUj. In an exemplary embodiment, this information can be included in the operator-specific fields and can include Node Name/ID, Link ID, Incarnation #, etc. The Node Name/ID uniquely identifies the node, the Link ID uniquely identifies the link associated with the node with the failure, and the Incarnation #identifies specific connections on the link that are affected by the failure. That is, the information is the same information in the RELEASE message 20.

Figure 5:
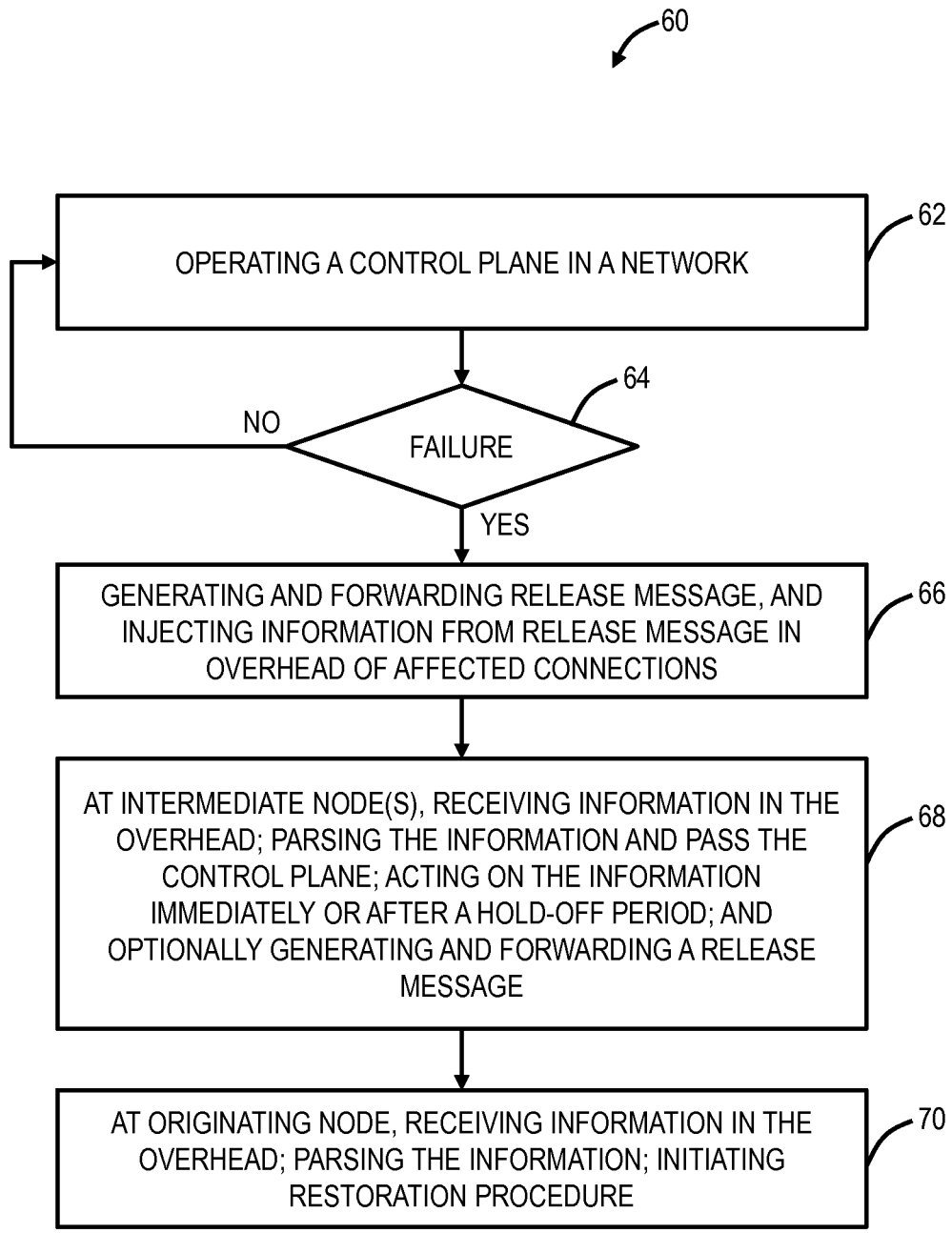
FIG. 5 is a flowchart of a fast mesh restoration process.

Referring to FIG. 5, in an exemplary embodiment, a flow chart illustrates a fast mesh restoration process 60. The fast mesh restoration process 60 contemplates operation in the network 10. The fast mesh restoration process 60 includes operating a control plane in a network (step 62). For example, the control plane can be a distributed control plane such as ASON, GMPLS, ORSP, etc. and the control plane can be source-based routed. The fast mesh restoration process 60 includes detecting a failure on or in a link in the network (step 64). Responsive to detecting the failure (step 64), the fast mesh restoration process 60 includes generating and forwarding a RELEASE message and injecting information from RELEASE message in the overhead of affected connections (step 66). The fast mesh restoration process 60 contemplates dual notification schemes—using the RELEASE message in control plane signaling and injecting the same information in the overhead for instantaneous notifications. The RELEASE message in control plane signaling can be referred to as a slow path and the overhead can be referred to as a fast path. The references to the slow path and the fast path are relative to one another. Specifically, the slow path operates sequentially and in software, and the fast path operates almost in parallel and in hardware through injection of data in overhead. Thus, the fast path is relatively faster than the slow path.

The fast mesh restoration process 60 includes, at intermediate node(s), receiving information in the overhead; parsing the information and passing it to the control plane; acting on the information immediately or after a hold-off period; and optionally, generating and forwarding a RELEASE message (step 68). That is, each of the intermediate node(s) can receive the information in the overhead and pass this information to the control plane to act. The control plane can run a timer for the hold-off period (e.g., 50 ms, etc.) to see if the originating node has acted before performing any action. For backward compatibility, each node, on receipt of failure information in FTFL, could initiate a RELEASE message to the neighboring node to RELEASE the CALL, in case other nodes do not support reading FTFL bytes for release information (because it may be on legacy software). If a node supports reading the FTFL information, the legacy RELEASE message may get ignored as a call object may already be deleted because of the information received in the FTFL. Thus, the fast mesh restoration process 60 is fully backward compatible with legacy nodes in the path.

The fast mesh restoration process 60 includes, at the originating node, receiving information in the overhead; parsing the information; and initiating a restoration procedure (step 70). Since receiving in frame data is much faster as compared to legacy RELEASE message (software controlled), there is a large time savings. The node ID and link ID in the information are used by the originating node for excluding the failed link from mesh restoration path, since routing updates have yet come through from the RELEASE messages, i.e., the slow path. Also, the originating node/terminating Node is responsible for squelching (i.e., removing or suppressing) FTFL bytes received, outside the call network, i.e. only nodes associated with the connection need the information. Since RELEASE information is included in frame ODU data, a number of nodes in the path has negligible impact on the time taken for this data to reach originating node.

Figure 6:
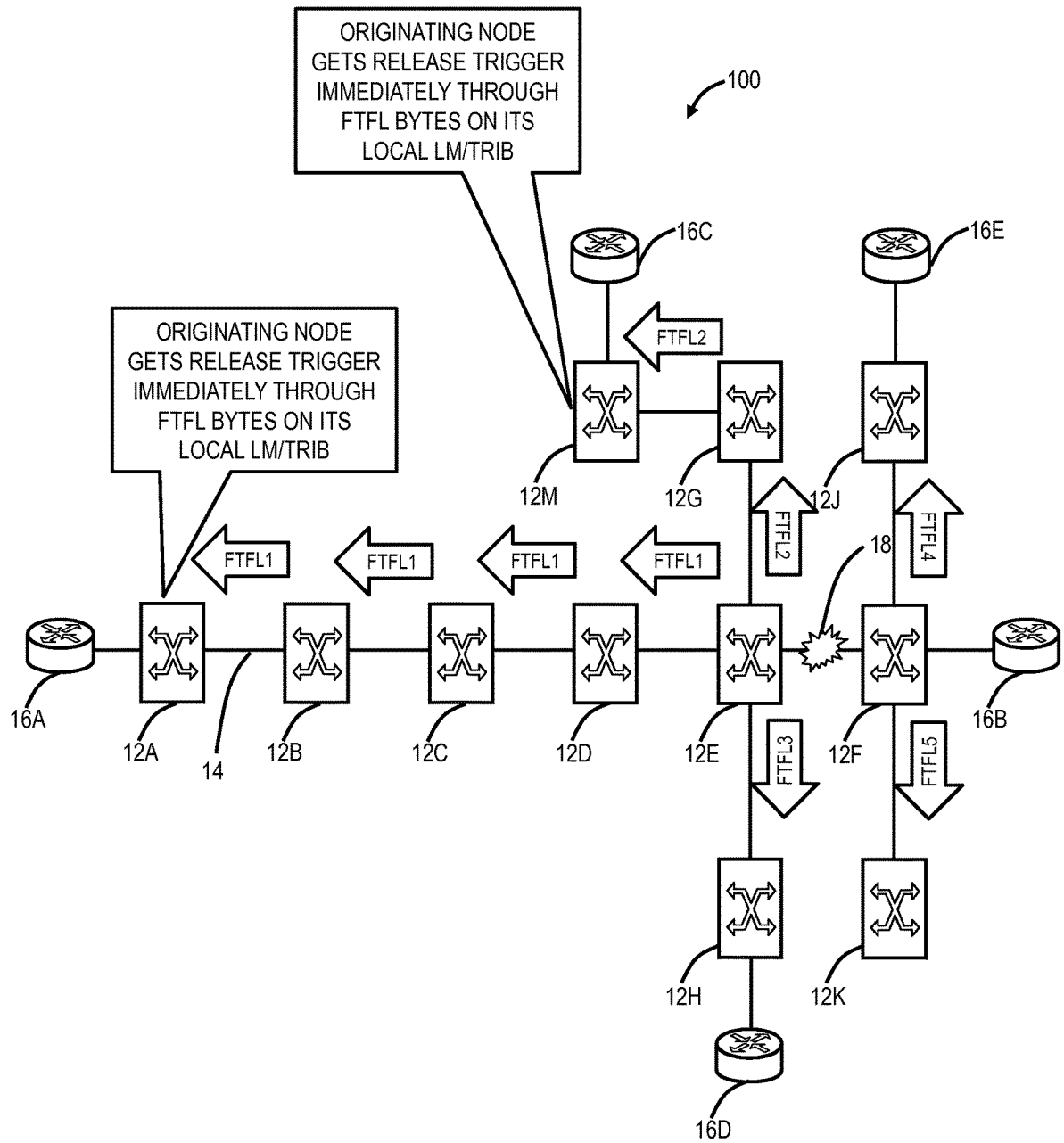
FIG. 6 is a network diagram of a network of a plurality of interconnected mesh nodes with associated CPEs.

Referring to FIG. 6, in an exemplary embodiment, a network diagram illustrates a network 100 of a plurality of interconnected mesh nodes 12A-12M with associated CPEs 16A-16E. The network 100 includes the network 10 as a portion therein, and shows additional nodes with mesh interconnections. For illustration purposes, the nodes 12A, 12M are originating nodes, and the failure 18 is in the same location as in the network 10. There are five different FTFLs—FTFL1-FTFL5 based on the direction away from the failure 18. In case some connections are originating at node 12A, node 12M, node 12H, etc. the node 12E injects RELEASE information (e.g., NodeName: NodeE, LinkID: <linkId>) in FTFL overhead toward all connections. Conversely, the node 12F also injects RELEASE information (e.g., NodeName: NodeF, LinkID:<linkId>).

Referring to FIGS. 7-8, in exemplary embodiments, logical diagrams illustrates a bidirectional fiber cut case (FIG. 7) and a unidirectional fiber cut case (FIG. 8) for the failure 18 in the network 100. That is, the failure 18 can affect both directions on the link 14, i.e. the bidirectional fiber cut case (FIG. 7), or a single direction on the link 14, i.e. the unidirectional fiber cut case (FIG. 8). In the bidirectional fiber cut case (FIG. 7), the nodes 12E, 12F each insert release information in the FTFL, such as in the forward FTFL 34 in the forward operator-specific field. This information can include node name: the node 12E or the node 12F, the link 14 ID, and the incarnation number (as described above, the incarnation number identifies specific connections on the link that are affected by the failure that is a link can include one or more connections). This forward FTFL 34 is propagated through a cloud of intermediate nodes to the associated originating nodes 12A, 12M, 12H. The originating nodes 12A, 12M, 12H include an FTFL interrupt which notifies the control plane and squelches the forward FTFL 34 since the forward FTFL 34 information is only needed in a call area or path. Specifically, the forward FTFL 34 information is not propagated by the originating nodes 12A, 12M, 12H. In the unidirectional fiber cut case (FIG. 8), the failure 18 is illustrated in a direction from the node 12E to the node 12F. Here, the release information is inserted in the backward FTFL 36 towards the associated originating nodes 12A, 12M, 12H by the node 12E. Conversely, the node 12F can insert the release information in the forward FTFL 34.

Referring to FIG. 9, in an exemplary embodiment, a block diagram illustrates an exemplary node 12 for use with the systems and methods described herein. In an exemplary embodiment, the exemplary node 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 12 can be any digital system with ingress and egress digital signals and switching therebetween of channels, timeslots, tributary units, etc. While the node 12 is generally shown as an optical network element, the systems and methods contemplated for use with any switching fabric, network element, or network based thereon.

In an exemplary embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 10, configured to operate the control plane as described herein. The node 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 14 to/from the node 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 14. From a logical perspective, the line modules 220 provide ingress and egress ports to the node 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 12 can include other components which are omitted for illustration purposes, and that the systems and methods described herein is contemplated for use with a plurality of different network elements with the node 12 presented as an exemplary type of a network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 12 is merely presented as one exemplary node 12 for the systems and methods described herein.

Figure 10:
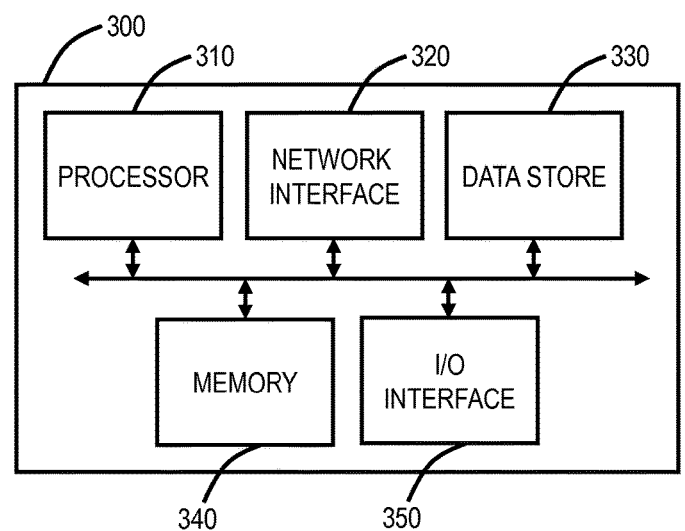
FIG. 10 is a block diagram illustrates a controller to provide control plane processing and/or operations, administration, maintenance, and provisioning (OAM&P) for the node of FIG. 9.

Referring to FIG. 10, in an exemplary embodiment, a block diagram illustrates a controller 300 to provide control plane processing and/or operations, administration, maintenance, and provisioning (OAM&P) for the node 12. The controller 300 can be part of common equipment, such as common equipment 210 in the node 12, or a stand-alone device communicatively coupled to the node 12 via the DCN 260. The controller 300 can include a processor 310 which is a hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an input/output (I/O) interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate with other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10, 100 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. In the present disclosure, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane in the network 10, 100. That is, the controller 300 is configured to implement software, processes, algorithms, etc. that control configurable features of the network 10, 100, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 300 can include a topology database that maintains the current topology of the network 10, 100 based on control plane signaling (e.g., HELLO messages) and a connection database that maintains available bandwidth on the links 14 again based on the control plane signaling. Again, the control plane is a distributed control plane; thus a plurality of the controllers 300 can act together to operate the control plane using the control plane signaling to maintain database synchronization. In source-based routing, the controller 300 at a source node for a connection is responsible for path computation and establishing by signaling other controllers 300 in the network 10, 100. For example, the originating node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 14 through the nodes 12 from the source node to the destination node based on a plurality of constraints such as administrative weights on the links 14, bandwidth availability on the links 14, etc. The originating node can also define the validation constraints that are provided in the setup messages.

In an exemplary embodiment, the line modules 220 are configured to form the links 14 and provide OTN, SONET, SDH, etc. lines. Again, for example, the line modules 220 can form OTN lines with the overhead 30. The line modules 220 can be configured to inject the RELEASE information in the overhead 30, to parse the data in the overhead, and to forward the data to the control plane. The control plane is operated by the controller 300. Thus, when the line modules 220 forwards information to the control plane, the line module 220 forwards the information to the controller 300. As described herein, the fast mesh restoration systems and methods are implemented in the line modules 220 whereas the control plane is implemented in the controller 300. Both can work concurrently, with the fast mesh restoration systems and methods providing immediate notification of failures (in the fast path) while the control plane operates in the slow path.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, by a node in a network using a control plane, for fast restoration in the network, the method comprising:
   detecting a failure on a link associated with the node; and
   providing failure information through in-band data path overhead of an affected connection, wherein the in-band data path overhead is sent over a fast path, wherein the failure information is received at an originating node of the affected connection via the fast path directly from the in-band data path overhead, prior to the originating node receiving the control plane signaling via a slow path relative to the fast path, wherein the failure information comprises control plane identification information which identifies the node and link in the control plane such that the failure information from the in-band data path overhead is provided to the control plane at a receiving node for action based thereon, wherein the originating node is configured to receive the failure information via the fast path and generate and forward associated control plane signaling over the slow path based on the failure and the control plane identification information,
   wherein the failure information is sent both over the in-band data path overhead and the control plane, and
   wherein the control plane operates in a distributed manner between the node and other nodes in the network via control plane signaling to establish and release network resources in an end-to-end manner.

2. The method of claim 1, wherein a restoration procedure is initiated, at the originating node, in the control plane responsive to receipt of the failure information from the fast path, prior to the originating node receiving the control plane signaling via the slow path.

3. The method of claim 2, wherein the restoration procedure excludes a node and a link associated with the failure information, and wherein the node and the link are excluded since routing updates in the slow path are not available at the originating node, upon receiving the failure information in the fast path.

4. The method of claim 1, wherein one or more intermediate nodes of the affected connection are configured to receive the failure information via the fast path, to parse and pass the failure information to the control plane operating at each of the one or more intermediate nodes, and to perform a first action based on the received failure information.

5. The method of claim 4, wherein the first action is releasing local resources associated with the affected connection, and forwarding routing updates related to the released local resources via the slow path.

6. The method of claim 4, wherein the first action is releasing local resources associated with the affected connection at an expiration of a hold-off period prior to receiving information from the originating node, or performing a second action based on the information from the originating node, responsive to receiving the information from the originating node within the hold-off period.

7. The method of claim 4, wherein one or more intermediate nodes are configured to generate and forward the control plane signaling via the slow path, upon receiving the failure information, to adjacent nodes that do not support the fast path.

8. The method of claim 1, wherein the originating node is configured to squelch the failure information in the overhead.

9. The method of claim 1, wherein the fast path operates in real-time via injection of the failure information in the data path overhead upon detection of the failure and is negligibly impacted in its time delay by a number of intermediate nodes between the node and the originating node, and
   wherein the slow path operates in software based on processing and forwarding the control plane signaling sequentially through the intermediate nodes to the originating node and is delayed based on the number of the intermediate nodes.

10. The method of claim 1, wherein the affected connection utilizes Optical Transport Network (OTN).

11. The method of claim 1, wherein the affected connection utilizes Optical Transport Network (OTN) and the failure information is inserted in Fault Type and Fault Location (FTFL) reporting communication channel bytes of the overhead.

12. The method of claim 11, wherein the failure information is inserted in either forward or backward operator-specific fields in the FTFL reporting communication channel bytes of the overhead, based on a direction of the failure.

13. A node, in a network using a control plane, configured for providing fast restoration in the network, the node comprising:
    one or more line modules configured to inject information in overhead on connections; and
    a controller communicatively coupled to the one or more line modules, wherein the controller is configured to operate a distributed control plane through a communications channel in the overhead, wherein the distributed control plane operates in a distributed manner between the node and other nodes in the network via control plane signaling to establish and release network resources in an end-to-end manner;
    wherein, responsive to a failure on a link, the one or more line modules are configured to inject failure information identifying the failure in the overhead of each one of affected connections, over a fast path directly in the overhead,
    wherein, responsive to the failure on the link, the controller is also configured to generate and forward the control plane signaling towards originating nodes of the affected connections over a slow path relative to the fast path; and
    wherein the failure information comprises control plane identification information which identifies the node and link in the control plane such that the failure information from an in-band data path overhead is provided to the control plane at a receiving node for action based thereon, wherein the originating node is configured to receive the failure information via the fast path and generate and forward associated control plane signaling over the slow path based on the failure and the control plane identification information, and wherein the failure information is sent both over the in-band data path overhead and the control plane.

14. The node of claim 13, wherein a restoration procedure is initiated in the control plane, responsive to the fast path prior to the originating node receiving the control plane signaling via the slow path.

15. The node of claim 14, wherein the restoration procedure excludes a node and a link associated with the failure information, wherein the node and the link are excluded since routing updates in the slow path are not available at the originating node upon receiving the information in the fast path.

16. The node of claim 13, wherein the affected connection utilizes Optical Transport Network (OTN).

17. The node of claim 13, wherein the affected connection utilizes Optical Transport Network (OTN) and the failure information is inserted in Fault Type and Fault Location (FTFL) reporting communication channel bytes of the overhead.

18. A network, comprising:
   a plurality of nodes interconnected by a plurality of links; and
   a control plane operating between the plurality of nodes, wherein the control plane operates in a distributed manner between the plurality of nodes in the network via control plane signaling to establish and release network resources in an end-to-end manner;
   wherein, responsive to detecting a failure on one link of the plurality of links, nodes associated with the link are configured to generate and forward control plane signaling based on the failure over a slow path and inject failure information based on the failure in overhead of affected connections over a fast path relative to the slow path,
   wherein an originating node of the affected connection is configured to receive the failure information via the fast path prior to receiving the information via the slow path; and
   wherein the failure information comprises control plane identification information which identifies the node and link in the control plane such that the failure information from an in-band data path overhead is provided to the control plane at a receiving node for action based thereon, wherein the originating node is configured to receive the failure information via the fast path and generate and forward associated control plane signaling over the slow path based on the failure and the control plane identification information, and wherein the failure information is sent both over the in-band data path overhead and the control plane.

19. The network of claim 18, wherein the affected connection utilizes Optical Transport Network (OTN) and the information based on the failure is inserted in Fault Type and Fault Location (FTFL) reporting communication channel bytes of the overhead.

* * * * *